United States Patent
Kim et al.

(10) Patent No.: US 12,330,800 B2
(45) Date of Patent: Jun. 17, 2025

(54) MANNED/UNMANNED AERIAL VEHICLE HAVING DEVICE FOR EMERGENCY CONTROL THROUGH POWER REGULATION

(71) Applicants: FORDRONE CO., LTD., Naju-si (KR); Weon Kook Kim, Andong-si (KR); Jin Kyo Shin, Yongin-si (KR); Kwang Rae Kim, Seoul (KR)

(72) Inventors: Weon Kook Kim, Andong-si (KR); Jin Kyo Shin, Yongin-si (KR); Kwang Rae Kim, Seoul (KR); Young Ju Jeong, Seoul (KR); Gang Hyeon Lee, Gunpo-si (KR)

(73) Assignee: FORDRONE CO., LTD., Naju-si (KR)

( * ) Notice: Subject to any disclaimer, the term of this patent is extended or adjusted under 35 U.S.C. 154(b) by 0 days.

(21) Appl. No.: 17/912,849

(22) PCT Filed: Sep. 17, 2020

(86) PCT No.: PCT/KR2020/012563
§ 371 (c)(1),
(2) Date: Sep. 19, 2022

(87) PCT Pub. No.: WO2021/187698
PCT Pub. Date: Sep. 23, 2021

(65) Prior Publication Data
US 2023/0147915 A1 May 11, 2023

(30) Foreign Application Priority Data
Mar. 17, 2020 (KR) .................. 10-2020-0032352

(51) Int. Cl.
*B64D 31/00* (2024.01)
*B64C 39/02* (2023.01)
(Continued)

(52) U.S. Cl.
CPC ............ *B64D 31/00* (2013.01); *B64C 39/024* (2013.01); *B64D 45/00* (2013.01); *B64U 10/00* (2023.01);
(Continued)

(58) Field of Classification Search
CPC ................... B64D 31/00; B64D 45/00; B64D 2045/0065; B64D 2045/0085;
(Continued)

(56) References Cited

U.S. PATENT DOCUMENTS 4,944,401 A * 7/1990 Groenewegen ........ H05K 5/021
220/592.2
5,283,643 A * 2/1994 Fujimoto ............... B64D 45/00
381/384
(Continued)

FOREIGN PATENT DOCUMENTS

JP 2006-180326 A 7/2006
KR 10-2018-0039496 A 4/2018
(Continued)

OTHER PUBLICATIONS

International Search Report for International application No. PCT/KR2020/012563 issued on Dec. 17, 2020.

*Primary Examiner* — Donald J Wallace
*Assistant Examiner* — Jalal C Coduroglu
(74) *Attorney, Agent, or Firm* — McLean IP Global; Jason Y. Pahng (57) ABSTRACT

Provided is an aerial vehicle including an emergency control device through power regulation. The aerial vehicle includes a power unit configured to supply power for the aerial vehicle, a flight control device configured to receive a wireless control signal from control terminal, and control a movement of the aerial vehicle based on the received control signal, and a power regulation device arranged between the
(Continued)

power unit and the flight control device and configured to transmit the power from the power unit to the flight control device, wherein the power regulation device includes a communication unit configured to externally receive an emergency control signal through certain radio waves, a verification unit configured to verify whether the received emergency control signal is given according to a predetermined authority, and a power regulation unit configured to cut off the power supplied from the power unit to the flight control device.

5 Claims, 4 Drawing Sheets

(51) Int. Cl.
| | |
|---|---|
| *B64D 45/00* | (2006.01) |
| *B64U 10/00* | (2023.01) |
| *B64U 50/19* | (2023.01) |
| *H04W 12/037* | (2021.01) |
| *H04W 12/069* | (2021.01) |

(52) U.S. Cl.
CPC .......... *B64U 50/19* (2023.01); *H04W 12/037* (2021.01); *H04W 12/069* (2021.01); *B64D 2045/0065* (2013.01); *B64D 2045/0085* (2013.01); *B64U 2201/20* (2023.01)

(58) Field of Classification Search
CPC ................ B64D 45/0034; B64D 27/24; B64C 39/024; B64U 10/00; B64U 50/19; B64U 2201/20; H04W 12/037; H04W 12/069; H04W 4/40; H04W 4/90; H04W 12/06; H04L 67/12; G05D 1/0022; G05D 1/0011; Y02T 50/60
See application file for complete search history.

(56) References Cited

U.S. PATENT DOCUMENTS

| | | | |
|---|---|---|---|
| 10,689,129 B1* | 6/2020 | Nehmeh ................. | B64D 47/00 |
| 2016/0292403 A1* | 10/2016 | Gong ...................... | G08G 5/006 |
| 2017/0106986 A1 | 4/2017 | Sweeny et al. | |
| 2017/0169713 A1* | 6/2017 | Gong ...................... | G08G 5/006 |
| 2018/0068567 A1* | 3/2018 | Gong ...................... | G05D 1/106 |
| 2019/0154439 A1* | 5/2019 | Binder .................... | G01S 15/08 |
| 2020/0198790 A1* | 6/2020 | Yagihashi ............... | B64D 17/80 |
| 2020/0290742 A1* | 9/2020 | Kumar .................... | B64D 27/35 |
| 2021/0092604 A1* | 3/2021 | Fox ........................ | H04L 9/0891 |
| 2023/0147915 A1* | 5/2023 | Kim ....................... | B64D 45/00 |
| | | | 701/2 |

FOREIGN PATENT DOCUMENTS

| | | |
|---|---|---|
| KR | 10-2074292 B1 | 2/2020 |
| KR | 10-2151970 B1 | 9/2020 |
| WO | 2016-026023 A1 | 2/2016 |

* cited by examiner

MANNED/UNMANNED AERIAL VEHICLE HAVING DEVICE FOR EMERGENCY CONTROL THROUGH POWER REGULATION

This application is a national stage application, filed under 35 U.S.C § 371, of international patent application number PCT/KR2020/012563, filed on Sep. 17, 2020, which is hereby incorporated by reference in its entirety. In addition, this application claims priority from Korean application number 10-2020-0032352, filed on Mar. 17, 2020, which is hereby incorporated by reference in its entirety.

TECHNICAL FIELD

The present disclosure relates to a manned/unmanned aerial vehicle, and more particularly, to a manned/unmanned aerial vehicle capable of emergency control through power regulation in an emergency.

BACKGROUND ART

Generally, unmanned aerial vehicles, or called drones, refer to airplane or helicopter shaped flying objects that move by a remote external control due to the induction of radio waves without a person directly on board to control. An unmanned aerial vehicle can move along a certain flight path according to a command transmitted from a control device, and may be used to perform functions of image capturing and surveillance on a specific area by using a camera or sensor mounted thereon. In early stage of commercialization, unmanned aerial vehicles have been mainly used for a military use for scouting, surveillance area shooting and target hitting, and the like, but recently, the scope of application thereof has widened very much to leisure, transportation, film, broadcasting, agriculture, and the like. Also, unmanned aerial vehicles having various sizes and performances have actively developed depending on the purpose of use. In particular, with an increasing use thereof, unmanned aerial vehicles are sometimes deployed and operated in areas inaccessible to humans, such as jungles, remote areas, volcanic areas, natural disaster areas, nuclear power plant accident areas, and the like.

As such, due to the advantage of being able to quickly perform tasks that cannot be done directly or is difficult to be done by humans by being put into areas that are inaccessible or difficult to enter, as the supply and use of unmanned aerial vehicles are rapidly increasing, concerns about various safety accidents according thereto are increasing. For example, there is a possibility of safety accidents as sudden abnormality occurs in the body of an unmanned vehicle in flight, (for example, an unmanned aerial vehicle flying in the city becomes an uncontrollable state and loses control and flies to an unintended location or crashes, etc. due to internal factors, such as mechanical failure and the like, or external factors, such as jamming of remote signal transmission from a remote controller, and the like. Furthermore, when an unmanned aerial vehicle enters and flies, by malicious users, an area requiring access control, such as national infrastructure, security facilities, power plants, military facilities, and the like, dangerous situations are likely to occur.

In addition, there is a possibility that threats similar to those described above may occur with regard to manned vehicles such as PAVs.

DESCRIPTION OF EMBODIMENTS

Technical Problem

Accordingly, in preparation for the possibility of occurrence of dangerous or threatening situations such as those described above, including terrorist attacks using manned/unmanned aerial vehicles, crashes due to body defects, and the like, provided is emergency urgent control for manned/unmanned aerial vehicles that have become uncontrollable by normal methods or fly, by malicious users, in areas and/or by methods that are not allowed.

Solution to Problem

According to an embodiment of the present disclosure, an aerial vehicle includes a power unit configured to supply power for the aerial vehicle, a flight control device configured to receive a wireless control signal from control terminal, and control a movement of the aerial vehicle based on the received control signal, and a power regulation device arranged between the power unit and the flight control device and configured to transmit the power from the power unit to the flight control device. The power regulation device includes a communication unit configured to externally receive an emergency control signal through certain radio waves, a verification unit configured to verify whether the received emergency control signal is given according to a predetermined authority, and a power regulation unit configured to cut off the power supplied from the power unit to the flight control device by activating a power regulation function of the power regulation device, only when the emergency control signal is verified to be given according to the predetermined authority.

According to an embodiment of the present disclosure, the control signal may be a wireless control signal received from a remote control terminal, and the certain radio waves through which the emergency control signal may be received have a frequency that is different from a frequency of waves through which the wireless control signal is received from the remote control terminal.

According to an embodiment of the present disclosure, the emergency control signal may be received in an encrypted state, and the verification unit of the power regulation device may be operated to store a predetermined key value, decode the emergency control signal received in the encrypted state, and check whether the decoded emergency control signal includes the predetermined key value.

According to an embodiment of the present disclosure, the emergency control signal may be received from an external emergency control authority owner having a predetermined key value who continuously monitor a flight state of the aerial vehicle and detect occurrence of abnormality of the aerial vehicle.

According to an embodiment of the present disclosure, the emergency control signal may be a signal generated by using the predetermined key value when the emergency control authority owner detects occurrence of abnormality of the aerial vehicle, and transmitted to the power regulation device of the aerial vehicle, and the occurrence of abnormality may include a case in which the aerial vehicle is uncontrollable by the remote control terminal, or the aerial vehicle trespasses without permission on an area where flight is not permitted.

According to an embodiment of the present disclosure, the aerial vehicle may further include a black box device for flight data configured to record flight data of the aerial vehicle and having impact resistance and heat resistance of a certain level or more.

According to an embodiment of the present disclosure, the power regulation device may be configured to be included in the black box device for flight data.

Advantageous Effects of Disclosure

According to the present disclosure, in case of an emergency situation, by performing power regulation (cut-off) by providing an emergency control command to a manned/unmanned aerial vehicle, forced crash of the manned/unmanned aerial vehicle is induced to cope with crisis. According to the present disclosure, when a manned/unmanned aerial vehicle is a state of being uncontrollable by a normal method and thus impossible to control by a signal control, or a malicious user flies a manned/unmanned aerial vehicle to enter into unauthorized areas and the like, as a final emergency urgent control solution, a power regulation method is used to induce forced crash, thereby preventing a more dangerous situation (for example, a trespass of a self-destructive drone into military/security facilities, a flight of an attack drone trespassing on a densely populated area, and the like).

BEST MODE

The present disclosure will now be described more fully with reference to the accompanying drawings, in which embodiments of the present disclosure are shown. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art.

Furthermore, terms used in the specification are used for explaining a specific embodiment, not for limiting the present disclosure. The expression of singularity in the specification includes the expression of plurality unless clearly specified otherwise in context. In the present disclosure, it is to be understood that the expressions such as "and/or" used herein may include all available combinations of items listed together. In the present disclosure, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

In an embodiment of the present disclosure, a "module" or "portion" may perform at least one of functions or operations, and may be implemented by hardware or software or a combination of hardware and software. Furthermore, a plurality of "modules" or "portions" may be integrated into at least one of modules to be implemented as at least one of processors, except a "module" or "portion" that needs to be implemented as specific hardware.

MODE OF DISCLOSURE

Hereinafter, an embodiment of the present disclosure is described in detail with reference to the accompanying drawings.

Figure 1:
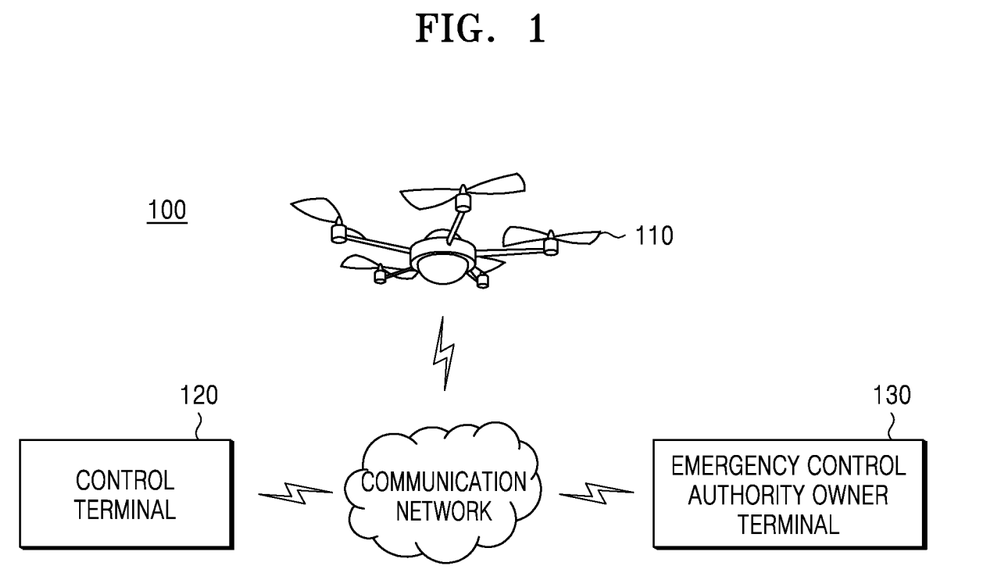
FIG. 1 is a view showing an unmanned aerial vehicle flight environment 100, according to an embodiment of the present disclosure.

FIG. 1 is a view showing an unmanned aerial vehicle flight environment 100, according to an embodiment of the present disclosure. As illustrated in the drawing, the unmanned aerial vehicle flight environment 100 may include an unmanned aerial vehicle 110, a control terminal 120, and an emergency control authority owner terminal 130.

The unmanned aerial vehicle 110 is an aerial vehicle that can be remotely controllable based on a control signal wirelessly received from the control terminal 120, and the like, without a person onboard. The unmanned aerial vehicle 110 may receive a control signal from the control terminal 120, according to a certain wireless communication method through a certain frequency band, and also provide a certain detection signal generated from the unmanned aerial vehicle 110 to the control terminal 120 and/or the emergency control authority owner terminal 130 through the corresponding frequency band. Although not illustrated in detail, the unmanned aerial vehicle 110 may be equipped with various equipment suitable for a flight purpose, such as cameras, various sensors, and the like, and may perform a certain given flight mission, such as image capturing, flight data collection, and the like.

According to an embodiment of the present disclosure, the unmanned aerial vehicle 110 may include one or more propellers and operating motors, and control the operation of each of the propellers and the operating motors and a flight state based on the control signal received from the control terminal 120. In the present drawings, the unmanned aerial vehicle 110 is illustrated as a quadcopter having four propellers, but the present disclosure is not limited thereto. According to another embodiment of the present disclosure, it is noted that the unmanned aerial vehicle 110 is equipped with more or fewer propellers and motors.

According to an embodiment of the present disclosure, the unmanned aerial vehicle 110 may continuously monitor, by using various sensors, pieces of information indicating the flight state of the unmanned aerial vehicle 110, for example, a flight location, an azimuth, a speed, an acceleration, a rotation angle, a takeoff/landing state, a flight path, a flight direction, an altitude, a body operating state, and the like, and may wirelessly transmit a result of the monitoring to the control terminal 120 and/or the emergency control authority owner terminal 130. According to an embodiment of the present disclosure, the unmanned aerial vehicle 110, as a result of the monitoring various pieces of information described above, may quickly detect abnormal symptom, such as drone body defects, control abnormality, or the like, and when the abnormal symptom, such as body defects, control abnormality, or the like, is detected, the unmanned aerial vehicle 110 may wirelessly transit a signal indicating the above abnormal symptom to the control terminal 120 and/or the emergency control authority owner terminal 130, through a certain frequency band.

According to an embodiment of the present disclosure, the control terminal 120 is a terminal held by a pilot who controls the unmanned aerial vehicle 110. The control terminal 120 may receive a control input that is input by the pilot, and transmit the control input to the unmanned aerial vehicle 110 wirelessly through a certain frequency band. According to an embodiment of the present disclosure, the control terminal 120 may further receive various detection signals transmitted from the unmanned aerial vehicle 110, and display the received signal on the control terminal 120.

According to an embodiment of the present disclosure, the control terminal 120 may communicate with the emergency control authority owner terminal 130 through a certain type of a communication network. According to an embodiment of the present disclosure, when an emergency situation related to the unmanned aerial vehicle 110 occurs, for example, the control of the unmanned aerial vehicle 110 by the control terminal 120 becomes an uncontrollable state based on the determination by a pilot, a signal indicating the abnormal symptom of from the unmanned aerial vehicle 110 is detected, or the like, the control terminal 120 may transmit a signal requesting emergency control to the emergency control authority owner terminal 130 through a certain type of a communication network, but the present disclosure is not limited thereto.

According to an embodiment of the present disclosure, the emergency control authority owner terminal 130 may be a terminal owned by an emergency control authority owner and capable of generating an emergency control command in case of an emergency situation related to the unmanned aerial vehicle 110 and transmitting the generated emergency control command to the unmanned aerial vehicle 110. According to an embodiment of the present disclosure, the emergency control authority owner may be, for example, one who may be an instructor in an unmanned aerial vehicle flight training place (for example, when the unmanned aerial vehicle 110 is an air vehicle for training belonging to a flight training place, and the like), or an administrator with unmanned aerial vehicle emergency control authority strictly delegated by the state (for example, persons with strictly limited powers delegated by the state to make important decisions related to national defense or social security).

According to an embodiment of the present disclosure, the emergency control authority owner terminal 130 may receive various detection signals transmitted from the unmanned aerial vehicle 110, and display the received signal on the emergency control authority owner terminal 130. According to an embodiment of the present disclosure, the emergency control authority owner terminal 130 may monitor the flight and movement of the unmanned aerial vehicle 110. According to an embodiment of the present disclosure, the emergency control authority owner terminal 130 may identify occurrence of an emergency situation based on the signal received from the unmanned aerial vehicle 110 and/or the signal received from the control terminal 120 through the communication network, and generate an emergency control command and transmit the generated command to the unmanned aerial vehicle 110. According to an embodiment of the present disclosure, the emergency control authority owner terminal 130 may store a certain key value for emergency control (for example, regulation codes confidentially stored and managed), and generated a control command based on the key value and transmit the generated control command to the unmanned aerial vehicle 110. According to an embodiment of the present disclosure, the emergency control authority owner terminal 130 may generate and encrypt an emergency control command including a certain key value for emergency control and transmit the encrypted command to the unmanned aerial vehicle 110.

Figure 2:
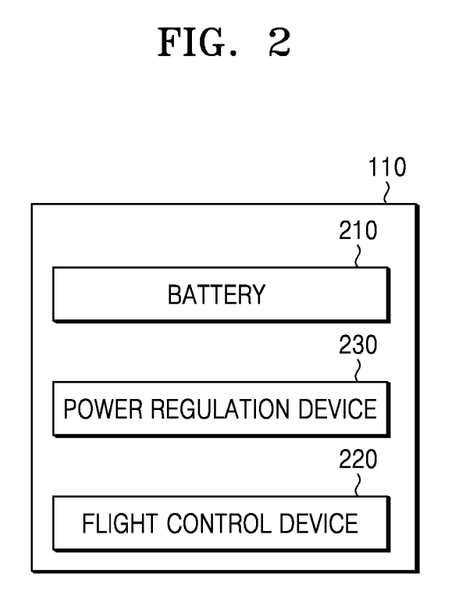
FIG. 2 is a schematic conceptual block diagram showing an internal configuration of the unmanned aerial vehicle 110 of FIG. 1.

FIG. 2 is a schematic conceptual block diagram showing an internal configuration of the unmanned aerial vehicle 110 of FIG. 1. As illustrated in the drawing, the unmanned aerial vehicle 110 may include a battery 210, a flight control device 220, and a power regulation device 230.

According to an embodiment of the present disclosure, the battery 210 may be configured to supply operation power for each unit of the unmanned aerial vehicle 110. According to an embodiment of the present disclosure, the battery 210 may be a certain secondary battery that is chargeable/dischargeable, but the present disclosure is not limited thereto.

According to an embodiment of the present disclosure, the flight control device 220 may be a core control device for controlling flight and related monitoring operations of the unmanned aerial vehicle 110. According to an embodiment of the present disclosure, the flight control device 220 may be operated by receiving power from the battery 210, may receive a wireless control signal from the control terminal 120 through a certain wireless frequency band, and may be operated to control the movement of the unmanned aerial vehicle 110 based on the received wireless control signal. According to an embodiment of the present disclosure, the flight control device 220 may also collect various detection signals described above related to the flight of the unmanned aerial vehicle 110, and transmit the signals to the control terminal 120 and the like.

According to an embodiment of the present disclosure, the power regulation device 230 may be arranged between the battery 210 and the flight control device 220 and configured to regulate the power from the battery 210 to be transmitted to the flight control device 220. According to an embodiment of the present disclosure, the power regulation device 230 may allow a limitless supply of operation power from the battery 210 to the flight control device 220, in a normal state (for example, a case in which the flight of the unmanned aerial vehicle 110 is controlled within a normal range through a remote control by the control terminal 120 and there is no emergency control signal). According to an embodiment of the present disclosure, the power regulation device 230 may be operated to cut off an operation power supply path between the battery 210 and the flight control device 220, when an emergency control signal is received from the emergency control authority owner terminal 130 having predetermined authority (for example, when a defect, such as breakdown and the like, occurs in the body of the unmanned aerial vehicle 110, the control terminal 120 enters an uncontrollable state due to jamming and the like, while the control of the unmanned aerial vehicle 110 by the control terminal 120 is in a normal state, a pilot on the control terminal 120 maliciously tries to perform a flight of the unmanned aerial vehicle 110 trespassing on a restricted/no entry area, and the like, an emergency control signal is generated from the emergency control authority owner terminal 130 that recognizes the occurrence of an abnormal situation as above and the emergency control signal is feedback to the unmanned aerial vehicle 110 feedback). According to an embodiment of the present disclosure, when the power regulation device 230 cuts off the supply of operation power from the battery 210 to the flight control device 220, the unmanned aerial vehicle 110 may loss the operation power and crash right on the spot.

As such, it is noted that the emergency control by the power regulation device 230 according to the present disclosure is a final control method for forcibly crashing the unmanned aerial vehicle 110, that is, a measure to be chosen and carried out in an urgent and critical situation, by which, even in this way, a huge risk or damage that would otherwise occur may be prevented.

According to an embodiment of the present disclosure, the power regulation device 230 may receive an emergency control signal from the emergency control authority owner terminal 130 through a certain frequency band. According to an embodiment of the present disclosure, the frequency band for receiving an emergency control signal may be the same as or different from the frequency band for communicating between the flight control device 220 of the unmanned aerial vehicle 110 and the control terminal 120. According to an embodiment of the present disclosure, the frequency band for receiving an emergency control signal may be a frequency band assigned identically or differently among the unmanned aerial vehicles 110. According to an embodiment of the present disclosure, the emergency control signal from the emergency control authority owner terminal 130 may be transmitted to a specific one unmanned aerial vehicle 110 as a target, or a plurality of relevant unmanned aerial vehicles (for example, heading for a particular restricted area) as a target. According to an embodiment of the present disclosure, for example, when one unmanned aerial vehicle is out of a normal control state, an urgent control signal may be generated and transmitted only for the unmanned aerial vehicle, to thus induce power regulation and forced crash. According to an embodiment of the present disclosure, for example, when a plurality of unmanned aerial vehicles try random illegal accesses to a specific restricted area (national safety facilities, military facilities, and the like), emergency control signals may be generated and transmitted to all the unmanned aerial vehicles, to thus induce power regulation and forced crash for each vehicle.

According to an embodiment of the present disclosure, although not specifically illustrated in the drawings, the unmanned aerial vehicle 110 may include a flight data device related to various certifications related to an unmanned aerial vehicle, flight history records, and the like (for example, a black box device and the like for the unmanned aerial vehicle 110 having impact resistance, heat resistance, and water resistance above a certain level). According to an embodiment of the present disclosure, the power regulation device 230 may be configured in the form of being coupled to the flight data device or black box device.

Figure 3:
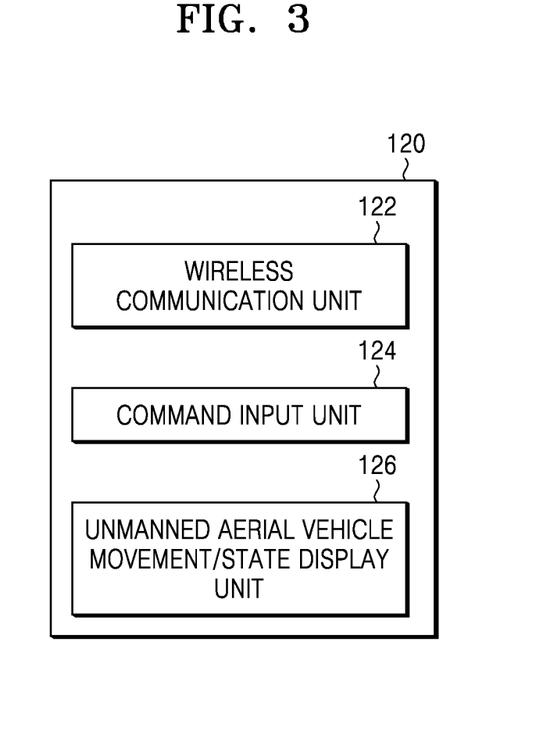
FIG. 3 is a schematic conceptual block diagram showing an internal configuration of a control terminal 120 of FIG. 1.

FIG. 3 is a schematic conceptual block diagram showing an internal configuration of the control terminal 120 of FIG. 1. As illustrated in the drawing, the control terminal 120 may include a wireless communication unit 122, a command input unit 124, and an unmanned aerial vehicle movement/state display unit 126.

According to an embodiment of the present disclosure, the communication unit 122 may be operated to wirelessly transmit a remote control signal for the unmanned aerial vehicle 110 through a certain frequency band. According to an embodiment of the present disclosure, the communication unit 122 may include, for example, a UHF (Ultra High Frequency)/VHF (Very High Frequency) transceiver for wireless data transmission, but the present disclosure is not limited thereto. According to an embodiment of the present disclosure, the communication unit 122 may also be operated to support wireless communication with the emergency control authority owner terminal 130, but the present disclosure is not limited thereto.

According to an embodiment of the present disclosure, the command input unit 124 is a user interface for inputting, by a pilot, a control command for the unmanned aerial vehicle 110. According to an embodiment of the present disclosure, the pilot may manually set the control of the unmanned aerial vehicle 110 through the command input unit 124, and in this case, as each control unit for the flight of the unmanned aerial vehicle 110 is provided through the command input unit 124, the flight of the unmanned aerial vehicle 110 may be controlled. According to an embodiment of the present disclosure, the pilot may automatically set the control of the unmanned aerial vehicle 110 through the command input unit 124, and in this case, the flight of the unmanned aerial vehicle 110 may be automatically controlled according to a preprogrammed path and order.

According to an embodiment of the present disclosure, the unmanned aerial vehicle movement/state display unit 126 may be a certain display device for displaying the movement path, current location and state, and the like of the unmanned aerial vehicle 110. According to an embodiment of the present disclosure, the unmanned aerial vehicle movement/state display unit 126 may further generate certain visible, audible, and/or vibration signals, and when a signal indicating the abnormal symptom, such as body defects, control abnormality, or the like, is received from the unmanned aerial vehicle 110, generate and provide the visible, audible, and/or vibration signal through the unmanned aerial vehicle movement/state display unit 126, thereby drawing attention from the pilot on the control terminal 120. In this case, the pilot may perform the control of the unmanned aerial vehicle 110, such as emergency control, for example, emergency landing, hovering, and the like, or transmit an emergency control request to the emergency control authority owner terminal 130, through the control terminal 120.

Figure 4:
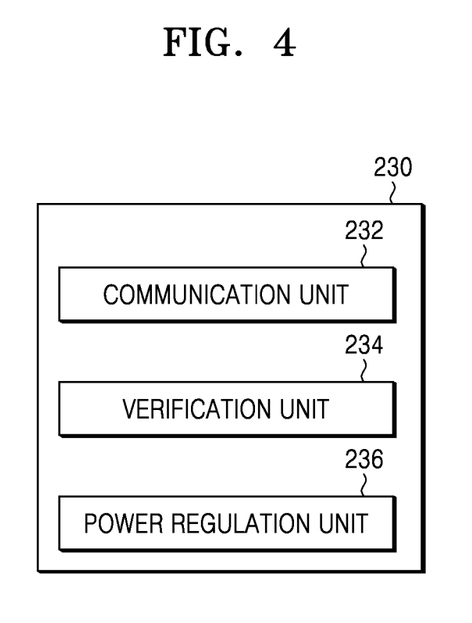
FIG. 4 is a schematic conceptual block diagram showing an internal configuration of a power regulation device 230 of FIG. 2.

FIG. 4 is a schematic conceptual block diagram showing an internal configuration of the power regulation device 230 of FIG. 2. As illustrated in the drawing, the power regulation device 230 may include a communication unit 232, a verification unit 234, and a power regulation unit 236.

According to an embodiment of the present disclosure, the communication unit 232 may be operated to receive an emergency control signal transmitted from the emergency control authority owner terminal 130 through a certain wireless frequency band. According to an embodiment of the present disclosure, when the emergency control signal received through the communication unit 232 is an encrypted signal, the verification unit 234 may decode the encrypted signal, and verify whether the emergency control signal is given from an emergency control authority owner with a predetermined right. According to an embodiment of the present disclosure, for example, the emergency control signal from an emergency control authority owner with a predetermined right may include a certain predetermined key value, and the verification unit 234 may verify whether the received emergency control signal includes the predetermined key value.

According to an embodiment of the present disclosure, when the emergency control signal is given from an emergency control authority owner with a predetermined right, as a verification result of the verification unit 234, the power regulation unit 236 may be operated to activate a power regulation function of the power regulation device 230 to cut off the power supplied from the battery 210 to the flight control device 220. As described above, when the activation of a power regulation function is taken place by the power regulation unit 236, the manned/unmanned aerial vehicle 110 may lose the operation power and crash right on the spot.

Although the present disclosure mainly described an unmanned aerial vehicle, the present disclosure is not limited thereto. It is noted that the spirit of present disclosure may be applied to a manned aerial vehicle with a person on board, for example, PAV (Personal Aerial Vehicle) and the like.

INDUSTRIAL APPLICABILITY

As can be seen by a person skilled in the art, the present disclosure is not limited to examples described above, and may be variously modified, reconstructed, and substituted within the scope of the present disclosure. It is noted that various technologies described in the present specification may be implemented by hardware, software, or a combination of hardware and software.

What is claimed:

1. An aerial vehicle including an emergency control device through power regulation, the aerial vehicle comprising:
   a power unit configured to supply power for the aerial vehicle;
   a flight control device configured to receive a wireless control signal from control terminal, and control a movement of the aerial vehicle based on the received control signal; and
   a power regulation device arranged between the power unit and the flight control device and configured to allow a limitless operation power supply from the power unit to the flight control device in a normal state and cut off the operation power supply from the power unit to the flight control device when an emergency control signal is received from an external emergency control authority owner terminal having a predetermined authority,
   wherein the power regulation device comprises:
   a communication unit configured to receive the emergency control signal from the emergency control authority owner terminal having the predetermined authority through certain radio waves;
   a verification unit configured to verify whether the received emergency control signal is given from the emergency control authority owner terminal having the predetermined authority; and
   a power regulation unit configured to cut off the power supplied from the power unit to the flight control device by activating a power regulation function of the power regulation device, only when the emergency control signal is verified to be given from the external emergency control authority owner terminal having the predetermined authority,
   wherein the emergency control signal is received in an encrypted state,
   wherein the verification unit of the power regulation device is configured to store a predetermined key value, decode the emergency control signal received in the encrypted state, check whether the decoded emergency control signal includes the stored predetermined key value, and verify the received emergency control signal to be given from the emergency control authority owner terminal having the predetermined authority when the decoded emergency control signal includes the stored predetermined key value, and
   wherein the emergency control signal is received from the emergency control authority owner terminal continuously monitoring a flight state of the aerial vehicle and detecting occurrence of abnormality of the aerial vehicle.

2. The aerial vehicle of claim 1, wherein the control signal is a wireless control signal received from a remote control terminal, and the certain radio waves through which the emergency control signal is received have a frequency that is different from a frequency of waves through which the wireless control signal is received from the remote control terminal.

3. The aerial vehicle of claim 1, wherein
   the occurrence of abnormality includes a case in which the aerial vehicle is uncontrollable by the remote control terminal, or the aerial vehicle trespasses without permission on an area where flight is not permitted.

4. The aerial vehicle of claim 1, further comprising a black box device for flight data configured to record flight data of the aerial vehicle and having impact resistance and heat resistance of a certain level or more.

5. The aerial vehicle of claim 4, wherein the power regulation device is configured to be included in the black box device for flight data.

* * * * *